UNITED STATES PATENT OFFICE.

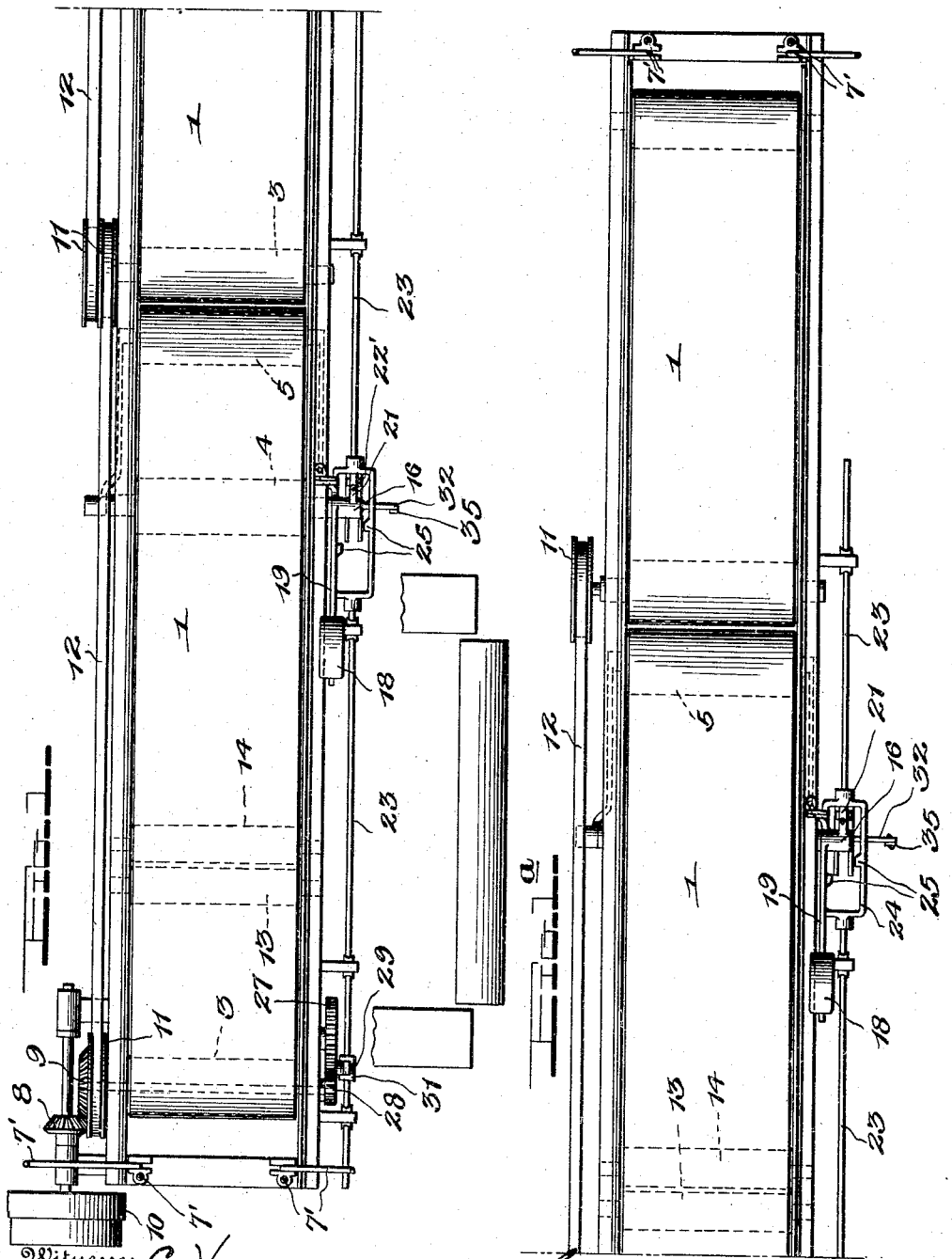

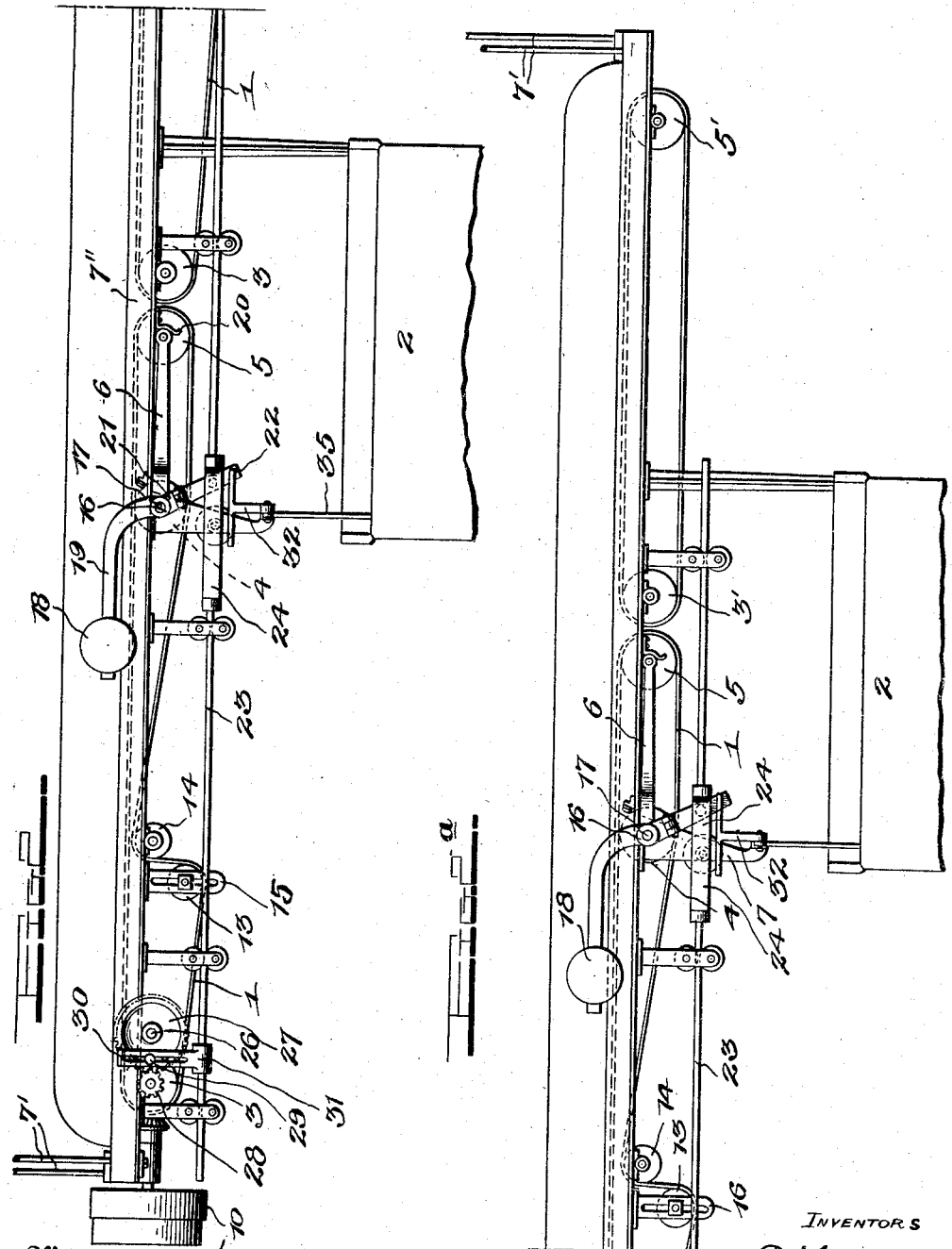

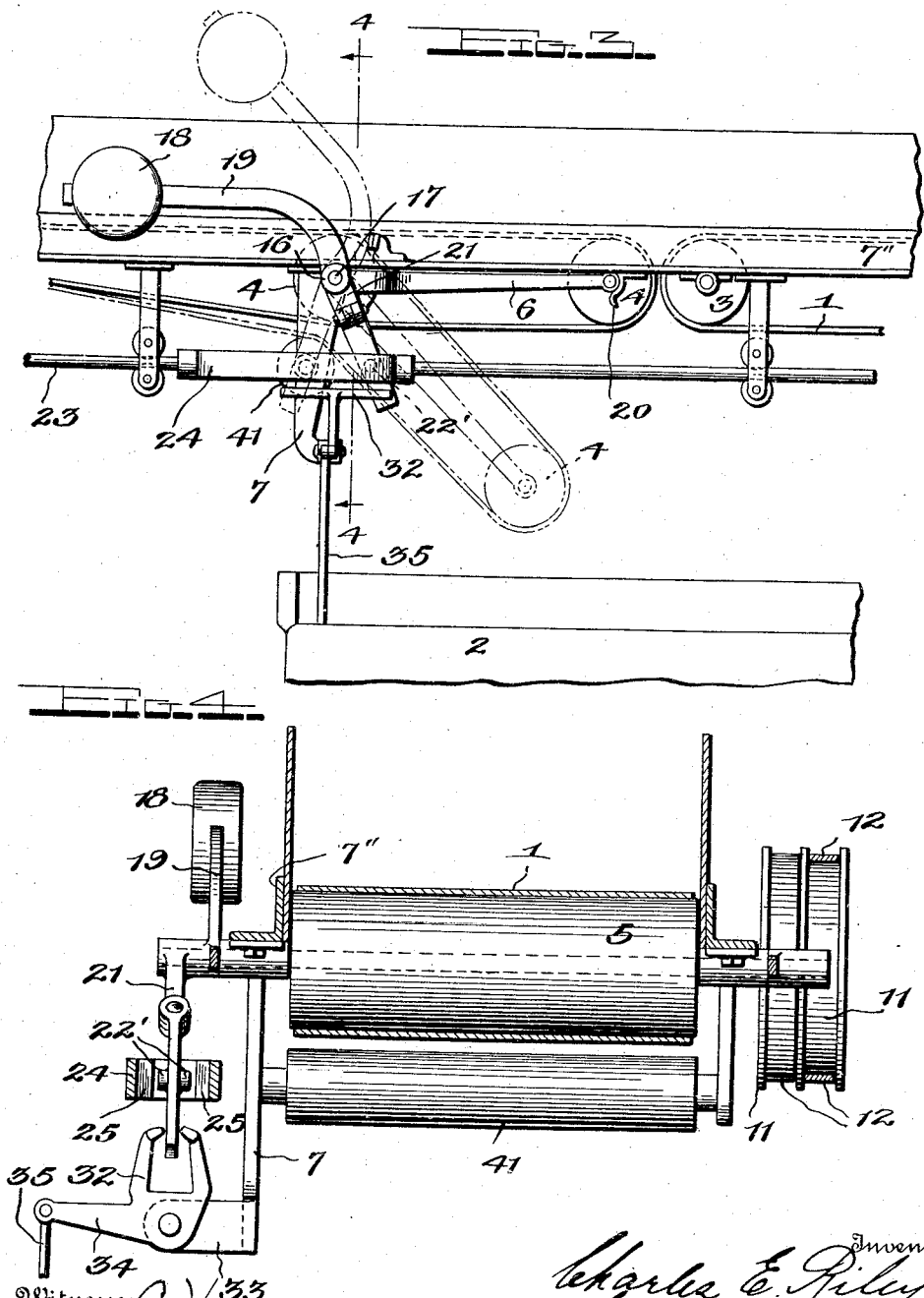

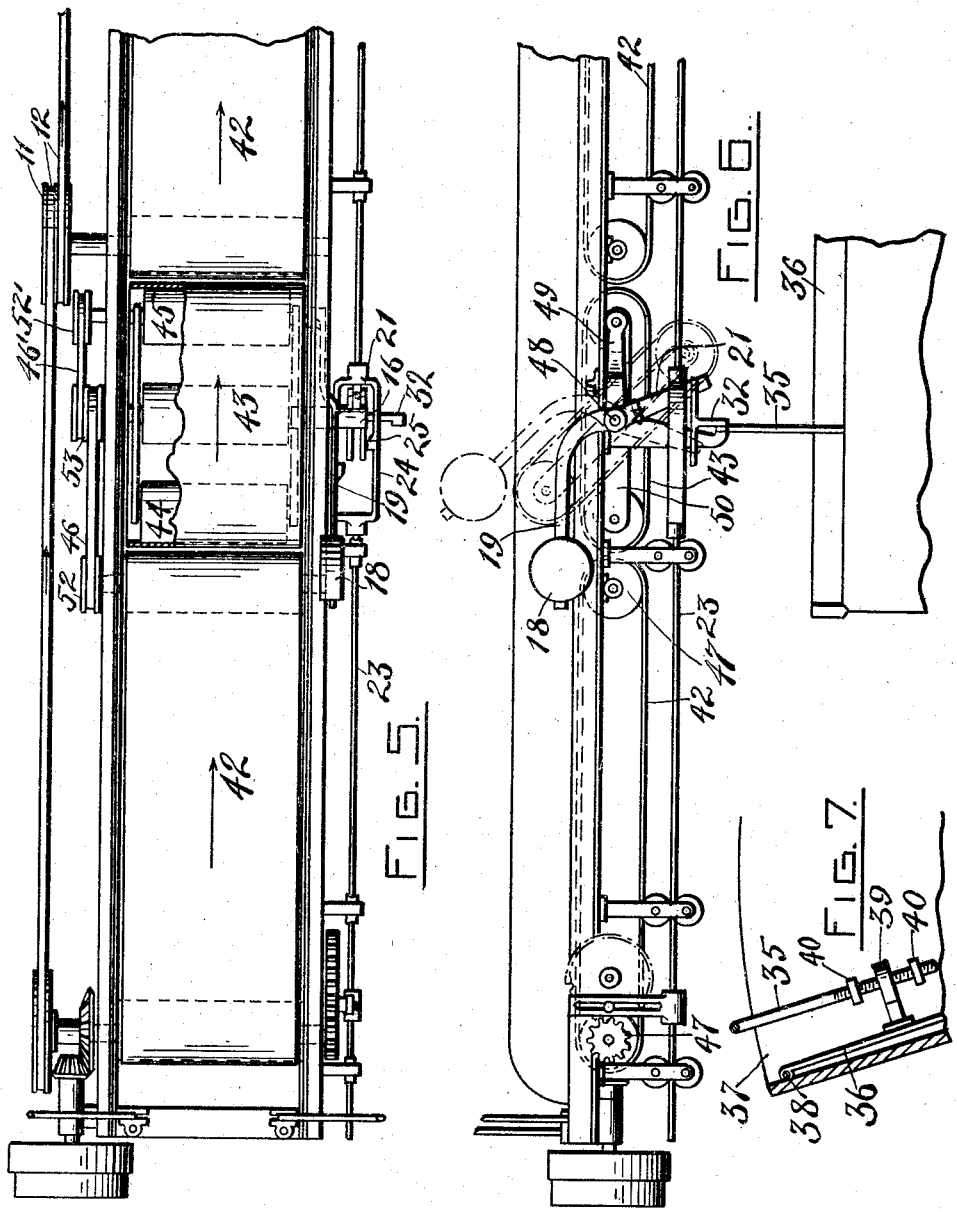

CHARLES E. RILEY, OF NEWTON, MASSACHUSETTS, AND CHARLES ROBINSON, OF PAWTUCKET, RHODE ISLAND, ASSIGNORS TO H. & B. AMERICAN MACHINE COMPANY, OF PAWTUCKET, RHODE ISLAND, A CORPORATION OF MAINE.

APPARATUS FOR DISTRIBUTING COTTON OR OTHER MATERIALS.

1,227,072. Specification of Letters Patent. Patented May 22, 1917.

Application filed June 26, 1916. Serial No. 105,902.

*To all whom it may concern:*

Be it known that we, CHARLES E. RILEY and CHARLES ROBINSON, citizens of the United States, residing, respectively, at Newton, in the county of Middlesex and State of Massachusetts, and Pawtucket, in the county of Providence and State of Rhode Island, have invented a new and useful Improvement in Apparatus for Distributing Cotton or other Materials, of which the following is a specification.

This invention relates to an apparatus for distributing cotton or other materials and particular reference to means for automatically maintaining a supply of cotton in the feeders or bins of a plurality of machines, such as openers and breakers.

The invention has for its object to provide a mechanism whereby cotton is conveyed from a common source and distributed to a plurality of machines and the practical maintenance of a uniform working supply at each machine.

A further object of the invention resides in the provision of an apparatus of the class above mentioned in which the distribution of the cotton is effected by a change in the position of a section of the conveyer medium by hand or at automatically determined intervals, the conveyer medium being sectionally constructed to permit the diversion of certain elements or portions of elements at the proper time.

Finally, it is an object of this invention to provide a simplified form of distributing apparatus, which will not become jammed at any of its feeding stations and will be positive in its action, both to direct a supply of material to a bin or feeder and to cut off the supply at the proper instant, whether done by hand or automatically.

With the above-mentioned objects in view, and others as will hereinafter appear, our invention will now be fully set forth and described, reference being had to the accompanying drawings, in which—

Figures 1 and 1ª represent, continuously, a plan view of the improved apparatus, comprising the present invention, with provision for supplying three bins or feeders.

Figs. 2 and 2ª represent, continuously, a side elevation of the same apparatus.

Fig. 3 is a detail side elevation of one of the dissecting mechanisms.

Fig. 4 is a transverse section, taken on the line 4—4 of Fig. 3.

Fig. 5 is a plan view, partly in section, of a modified form of the invention.

Fig. 6 is a side view of the form of Fig. 5, and

Fig. 7 is a detail view of a feeder device for controlling the action of the material delivering or diverting into a bin or feeder.

Referring now more particularly to said drawings 1 indicates each one of a succession of endless belt conveyers which together constitute the means of carrying the cotton supply to and over a plurality of bins or feeders 2 for the machine, each machine being provided with one of said bins or feeders. Said conveyers 1 are each mounted on a set of rollers 3—4, which are journaled in suitable manner on a continuous frame or supporting structure 7'', which is, or may be, carried by suspensory elements 7', and a swinging roller 5 mounted in a bracket 6 which is hereinafter described.

The first roller 3 is directly driven by a bevel gear drive 8—9 connected to any suitable power source through the pulley 10 to communicate motion to the first belt 1.

The shafts of each of the rollers 3 also carry belt pulleys 11 which carry the drive belts 12 for furnishing power to each of the conveyer or belt sections.

Also carried by the frame or supporting structure 7'' are the adjusting rollers 13 and the bight supporting rollers 14, an adjusting roller and bight supporting roller being provided for each conveyer section, and the bight supporting rollers coacting with the rollers 5 of the swinging frames 6 to keep the conveyer sections taut. The adjusting rollers 13 are journaled on shafts the ends of which are threaded and projected into vertical slots provided in the depending brackets 15 secured to the frame 7'', and the lower runs of the conveyer sections are passed below the rollers 13 and over the rollers 14. The rollers 14 are mounted at a higher level than the rollers 13 and in front of the latter. The swinging frames 6 each constitute a pair of forwardly projecting arms which are, or may be, formed into trunnions 16 at their rear ends journaled on the extended ends 17 of the shaft of the rollers 4 so as to permit said frames to swing downwardly below the level of the frame 7''. Journaled between the outer or front ends of the arms of the frames 6 are the rollers 5 which carry the forward ends of the conveyer or belt sections, so that, as is evident from Fig. 1, when the frames 6 are in elevated or normal position, the upper runs of the sections operate in a single plane and the lower runs, extending from the rollers 5 rearwardly, pass under the rollers 4, over the bight supporting rollers 14, under the adjusting rollers 13 and thence to the rear or first rollers 3.

The swinging frames or yokes 6 are held in their normal or elevated positions by means of the counterweights 18 slidably mounted on the arms 19, which are mounted on the trunnions 16 of the yokes 6, and are also locked or latched in normal position by means of spring catches 20. Extending downwardly from the trunnions 17 on one side of the machine are the short arms or studs 21 to which are hinged for transverse movement the arms 22 having laterally projecting studs 22' (Fig. 4) extending from opposite sides thereof, by which the yokes 6 are adapted to be locked to a depressing and elevating mechanism which will now be described.

Mounted at the side of the machine, adjacent the arms 22 and so as to have a longitudinal reciprocating movement parallel to the frame 7'' is an actuating element 23, which is formed of alined bar sections between which are interposed the yokes 24. The latter consist of rectangular devices having comparatively long parallel sides which extend parallel with the bar sections and inclose the downwardly projecting arms 22, which normally lie midway between the two sides. The two sides carry integrally therewith inwardly projecting lugs or catches 25, which are arranged to operate in opposite directions. That is, the catches are adapted to be engaged in turn by the lugs 22', and in opposite directions of movement of the actuating element 23. Thus, each catch or lug 25 is provided with a vertical face and a bevel face, but they are pointed in opposite directions, so that when the element 23 is moved in a forward direction the lug on one side of the yoke is operative on the arm 22, provided the latter is swung into position at one side of the middle line through the yoke so as to be in the path of the lug 25 at that side, while the other lug or catch is operative when the element 23 moves in the rearward direction. At the front end of the machine is mounted a shaft or stud 26 on which is secured a gear wheel 27 which meshes with a gear 28 on the end of the shaft of the roller 3. Said gear wheel 27 carries on its face a pin 29, which engages in a slot 30 formed in a plate 31 secured in a vertical position on the first rod section of the element 23. When the gear wheel 27 is driven by the gear 28 the pin 29 operating in the slot 30 imparts a reciprocating movement to the element 23, so that throughout the operation of the machine, a continuous operative action is kept up by the element 23.

In Fig. 4 is shown a device for causing the arms 22 to be swung laterally to engage one or the other of the studs 22' with the catches or lugs 25. A two pronged fork 32 pivoted on a suitable bracket 33 formed on the side of the machine embraces the opposite sides of the lower end of the arm 22, and has an arm or extension 34 pivotally connected to a rod 35. The opposite end of the rod 25 is secured to a feeler 36 (Fig. 7) hinged to the side of the bin or feeder 37 at 38, the attachment being an adjustable one through the provision of a threaded end on the rod 35, which extends loosely through an eyelet 39, and carries on each side of the lattter a set-nut 40, whereby the amount of play of the rod 35 in the eyelet is regulated. The feeler 36 swings to and fro according to the amount of cotton in the bin, and thereby controls the movement of the arm 22, which in turn is brought into line with one or the other of the catches 25, and causes the actuation of the conveyer section to which the particular controlling and actuating means belongs.

Referring to Fig. 3, it will be noted that when the swinging frame 6 is depressed, the lower run of the conveyer leaves the roller 4 and that the upper run is bent downwardly over the same roller. A roller 41 is provided to support the lower run at this time, and to provide a bending point therefor, and at this time also, the bight supporting roller 14 preserves the taut condition of the belt, so that the upper run may be kept in a proper condition to carry the cotton supply. When the feeler 36 acts in the bin or feeder to indicate that the cotton supply therein is low, the fork 32 swings to one side to throw the arm 22 in engagement with the catch on the yoke 24 of the element 23. The movement of the latter pushes the connection 21—22 rearward and therewith the frame 6 and the arm 19, with the consequent lowering of the roller 5 and the forward end of the conveyer 1, thus interrupting the continuous forward travel of the cotton and causing the latter to fall into the bin 37 until such time as the feeler is moved to cause the removal of the arm 22 from engagement with the yoke 24 at one side, and is swung over to the other side to engage with the lug or catch 25 thereon, when the movement of the element 23 will carry the arm rearwardly and permit the restoration of the conveyer section to normal position. The arm 22 is then permitted to leave off its contact with the yoke 24, through the loose connection between the feeler 36 and the rod 25, until such time as the cotton supply in this particular bin must be again replenished. It will be seen from Fig. 1ª that the foremost conveyer does not require a dumping or depressing means, as its end is directly placed over the bin or feeder of the last machine, and the cotton fed thereto is that which is not required by the intervening machines.

In Figs. 5 and 6 is shown a modified form of the invention. The element 23 and the control mechanism operating between the bins and the arms 22 are the same as above, but the conveyers are somewhat differently disposed. The complete run or machine consists of a series of belts which do not permit of the swinging of their ends to dump the cotton, and intermediate rotary conveyer sections which are tipped up to interrupt the flow of the cotton. The stationary runs are indicated by 42, and operate over the rollers 47, which are mounted in the sides of the frame 7″. Also journaled in the sides of the frame 7″ and substantially over the middle of the bin 36 is a shaft 48, upon which is mounted a swinging frame 50, comprising a pair of side members having their middle points secured to the shaft 48, and carrying at their ends the belt rollers 44 and 45, around which is mounted the endless belt 43. A bracket 49 also secured to the shaft 48 has as an extension the arm 22, which performs the same functions in the same manner as the arm 22 of the hereinbefore described apparatus. The conveyer is driven by a belt 46 carried over the pulley 52 and the loose double pulley 53, the pulley 52 being carried by and driven from the shaft of the roller 47, and the pulley 53 being carried by the shaft 48. The belt 46 acts to revolve the double pulley 53 and through the belt 46′ and pulley 52′, the roller 45 to drive the belt 43 in the usual manner.

With the above description of our improved cotton distributing apparatus, it will be evident that with a minimum of mechanism and the least expenditure of power, we are enabled to keep a number of machines supplied with cotton, and that our machine can carry out its process without danger of becoming clogged and jammed by the cotton, since no interfering side elements are employed to push the cotton off from the sides of the conveying elements.

Having thus described our invention, we claim as new and desire to secure by Letters Patent;—

1. An apparatus for distributing cotton, comprising in combination, a series of conveyer belts placed in alinement to form a continuous bed, each of said sections being carried and driven by a set of rollers, means for depressing the roller at the forward end of the conveyer sections to dump cotton therefrom.

2. An apparatus for distributing cotton comprising in combination, a series of conveyer sections, each comprising an endless belt and supporting rollers, frames movable with relation to said conveyer sections carrying a forward roller of each section, a driving means common to all of said movable frames, and means for connecting any one of said frames to said driving means to depress the end of a section.

3. An apparatus for distributing cotton, comprising in combination, a series of conveyer sections, each of said sections comprising an endless belt and supporting rollers, means for carrying some of said rollers in movable relation with respect to the common line of movement of the conveyer sections, means for actuating said rollers to carry the thereby supported portion of the conveyer section out of the line of movement of the sections, a common driving means for engagement by said means for actuating the rollers, and means for selecting any of said sections for automatic operation.

4. An apparatus for distributing cotton, comprising in combination, a series of conveyer sections, means for supporting said sections, and each section consisting of an endless belt and rollers carrying the latter, a swinging frame supporting one of the rollers of each section, means to engage said frame to actuate the latter at intervals, and means to determine the intervals of such engagement.

5. An apparatus for distributing cotton, comprising in combination, a series of conveyer sections, means for supporting said sections, and each section consisting of an endless belt and rollers carrying the latter, a swinging frame supporting one of the rollers of each section, means to counterbalance said swinging frame, means to tension said belts, means to engage said frame to actuate the latter at intervals, and means to determine the intervals of such engagement.

6. An apparatus for distributing cotton, comprising in combination, a series of conveyer sections, means for supporting said sections, and each section consisting of an endless belt and rollers carrying the latter, a swinging frame supporting one of the rollers of each section, means to counterbalance said swinging frame, means to tension said belts, means to take up the bight of the belt when said frames are swung out of the normal line of the conveyer, means to engage said frame to actuate the latter at intervals, and means to determine the intervals of such engagement.

7. An apparatus for distributing cotton, comprising in combination, a supporting frame, a series of conveyer sections carried by said frame, each of said sections comprising a set of rollers and an endless belt carried thereby, a swinging frame carried by said supporting frame for each section, and carrying one of the rollers of its corresponding section, a movable arm carried by each of said frames, a continuously movable reciprocating element adapted to be engaged by said arms at intervals to cause the actuation of said frames and a feeler associated with each of said arms to cause the interposition of the latter into the path of said reciprocating element.

In testimony whereof we have signed our names to this specification in the presence of two subscribing witneses.

CHARLES E. RILEY.
CHARLES ROBINSON.

Witnesses:
T. O. NICHOLSON,
E. P. RICHARDSON.

Copies of this patent may be obtained for five cents each, by addressing the "Commissioner of Patents, Washington, D. C."